Patented Jan. 25, 1938

2,106,518

UNITED STATES PATENT OFFICE 2,106,518

MANUFACTURE OF COLORED LACQUERS AND COATING COMPOSITIONS

Achille Conzetti, Basel, Switzerland, assignor to the firm J. R. Geigy A. G., Basel, Switzerland No Drawing. Application September 25, 1935, Serial No. 42,136. In Germany January 20, 1934

10 Claims. (Cl. 134—79)

In my U. S. patent application Ser. No. 702,097, filed December 12, 1933, there is described a process for making colored lacquers and coatings in the form of films which consists in dissolving in the lacquer to be colored a dyestuff of the triarylmethane series or a leuco-body thereof, both having groups capable of being mordanted, and developing the dyestuff or leuco-body to the colored chromium compound by means of chromic acid or a salt thereof.

The present invention is an improvement in or modification of that described above and is based on the observation that the process is not limited to the production of complex chromium color-lakes, but may be extended generally to those metals which are suitable for making color-lakes. In other respects the process remains the same; the dyestuff is dissolved in the lacquer to be colored in the form of the dyestuff acid or a salt thereof; the mordant compound is added either simultaneously or in succession, generally while gently warming, whereby the formation of color-lake begins directly. Filtering is unnecessary and the lacquer is immediately available for use.

The coatings and films produced from the colored lacquers thus made are characterized in general by good fastness to light, but for the most part are somewhat inferior in this respect to the chromium lakes. On the other hand, by having at disposal several metals to form the complex dyes, color-lakes of all tints and with any desired properties can be made to satisfy the various demands.

The available metals include all those which are used for the production of dyestuff metal salts, particularly copper, nickel, cobalt and iron salts. They may be used separately or mixed together.

Almost any lacquer or varnish forming films may be employed, for instance acetyl cellulose lacquers, nitrocellulose lacquers, lacquers from artificial resins, like condensation products of phthalic acid and glycerine, chlorinated rubber lacquers, gelatine solutions, spirit lacquers, linseed oil and lithographic varnishes of the usual composition, for instance those which are described in more detail in the aforesaid application. The colored lacquers can be mixed with each other.

The following examples illustrate the invention:—

Example 1

0.5 gram of the dystuff acid from Eriochrome Azurol B (Color Index No. 710) are dissolved in 100 grams of nitrocellulose lacquer and 0.25 gram of copper acetate is added; the brilliant blue color is developed by gently warming.

Example 2

0.5 gram of Eriochrome Geranol R—dyestuff acid (a dyestuff from 3 mol. of o-cresotinic acid instead of salicylic acid analogous to Color Index No. 727) is dissolved in 100 grams of acetyl-cellulose lacquer and heated gently with 0.5 gram of copper acetate to develop the red-violet color; in the fastness to light it is equivalent to the lacquer containing the chromium complex compound.

Example 3

0.5 gram of the dyestuff acid from Eriochrome Cyanine R (Color Index 722), 100 grams of acetyl-cellulose lacquer and 1.5 grams of cobalt acetate are converted, as indicated in the foregoing examples, into a violet-red lacquer.

Example 4

0.5 gram of the triphenylmethane dyestuff acid made from one mol. of 2-chloro-4-dimethylaminobenzaldehyde and two mol. of 2-hydroxy-3-methyl-benzene-carboxylic acid, 100 grams of spirit lacquer and 1.5 grams of nickel acetate are converted in the manner described above into a red-violet lacquer.

Example 5

0.5 gram of the dyestuff acid used in Example 4, 100 grams of nitrocellulose lacquer and 1.5 grams of ferrous acetate or the equivalent mixture of ferrous sulphate and sodium acetate are made up into a blue lacquer in the manner described above.

Example 6

0.5 gram of the mordant dyestuff of the phthalein series, obtainable by condensing phthalic anhydride, dimethyl-m-aminophenol and β-resorcylic acid in molecular proportions, 100 grams of nitrocellulose lacquer and 0.5 gram of copper acetate, are developed to a brilliant red lacquer in the manner described above.

What I claim is:—

1. A process for the manufacture of complex compounds containing a triarylmethane dyestuff, a metal selected from the group consisting of Cu, Fe, Co and Ni and a cellulose derivative, comprising treating the dyestuff acid of a triarylmethane dyestuff which contains at least once in the molecule the groups OH and COOH in ortho position to one another, in presence of a cellulose ester lacquer with an acetate of a metal selected from the group consisting of Cu, Fe, Co and Ni.

2. A process for the manufacture of complex compounds, containing a triarylmethane dyestuff, a metal selected from the group consisting of Cu, Fe, Co and Ni and a cellulose derivative, comprising treating the dyestuff acid of a triarylmethane dyestuff which contains at least once in the molecule the groups OH and COOH in ortho position to one another, in presence of a nitro-cellulose lacquer with an acetate of a metal selected from the group consisting of Cu, Fe, Co and Ni.

3. A process for the manufacture of complex compounds, containing a triarylmethane dyestuff, a metal selected from the group of Cu, Fe, Co and Ni and a cellulose derivative, comprising treating the dyestuff acid of a triarylmethane dyestuff which contains at least once in the molecule the groups OH and COOH in ortho position to one another in presence of acetylcellulose lacquer with an acetate of a metal selected from the group consisting of Cu, Fe, Co and Ni.

4. A process for the manufacture of complex compounds containing a triarylmethane dyestuff, copper and a cellulose derivative, comprising treating the dyestuff acid of Eriochrome Azurol B in presence of nitrocellulose with copper acetate.

5. A process for the manufacture of complex compounds containing a triarylmethane dyestuff, cobalt and a cellulose derivative, comprising treating the dyestuff acid of Eriochrome Cyanine R in presence of acetylcellulose with cobalt acetate.

6. A process for the manufacture of complex compounds containing a triarylmethane dyestuff, iron and a cellulose derivative, comprising treating the dyestuff acid of the dyestuff from one molecule of 2-chloro-4-dimethylaminobenzaldehyde and 2 molecules of 2-hydroxy-3-methylbenzene-carboxylic acid in presence of nitro-cellulose with ferrous acetate.

7. A composition comprising the reaction products obtained by mixing copper acetate in nitrocellulose lacquer with the dyestuff acid from Eriochrome Azurol B.

8. A composition comprising the reaction products obtained by mixing cobalt acetate in acetyl cellulose lacquer with the dyestuff acid of Eriochrome Cyanine R.

9. A composition comprising the reaction products obtained by mixing ferrous acetate in a cellulose ester lacquer with the dyestuff acid of the dyestuff made from 1 mol. of 2-chloro-4-dimethyl-aminobenzaldehyde and 2 mols of 2-hydroxy-3-methylbenzene-carboxylic acid.

10. A composition comprising the reaction products obtained by mixing ferrous acetate in nitrocellulose lacquer with the dyestuff acid of the dyestuff made from 1 mol. of 2-chloro-4-dimethylaminobenzaldehyde and 2 mols of 2-hydroxy-3-methylbenzene-carboxylic acid.

ACHILLE CONZETTI.